(12) United States Patent
Son et al.

(10) Patent No.: US 10,955,720 B2
(45) Date of Patent: Mar. 23, 2021

(54) ELECTRICALLY RECONFIGURABLE OPTICAL APPARATUS USING ELECTRIC FIELD

(71) Applicant: HRL Laboratories, LLC, Malibu, CA (US)

(72) Inventors: Kyung-Ah Son, Moorpark, CA (US); Jeong-Sun Moon, Moorpark, CA (US); Ryan G. Quarfoth, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 4 days.

(21) Appl. No.: 16/296,049

(22) Filed: Mar. 7, 2019

(65) Prior Publication Data

US 2019/0278150 A1    Sep. 12, 2019

Related U.S. Application Data

(60) Provisional application No. 62/641,249, filed on Mar. 9, 2018.

(51) Int. Cl.
*G02F 1/03* (2006.01)
*G02B 26/00* (2006.01)
(Continued)

(52) U.S. Cl.
CPC .......... *G02F 1/19* (2013.01); *G02B 27/0977* (2013.01); *H04N 5/33* (2013.01)

(58) Field of Classification Search
CPC .......... G02F 1/315; G02F 1/03; G02F 1/0316; G02F 1/0123; G02F 1/0322; G02F 1/29;
(Continued)

(56) References Cited

U.S. PATENT DOCUMENTS

2006/0050358 A1    3/2006 Bigman
2007/0053139 A1*   3/2007 Zhang ............... H01L 21/02266
                                                           361/311
(Continued)

FOREIGN PATENT DOCUMENTS

JP    2007-147934    6/2007

OTHER PUBLICATIONS

"Correlated Perovskites as a New Platform for Super-Broadband-Tunable Photonics", Zhaoyi et al. (2016), DOI: 10.1002/adma.201601204.
(Continued)

*Primary Examiner* — Dawayne Pinkney
(74) *Attorney, Agent, or Firm* — Ladas & Parry

(57) ABSTRACT

An optical apparatus may comprise: an electrically reconfigurable optical layer comprising at least one phase-change material, wherein an optical property of the phase-change material is reconfigurable by an electric field; an optically transparent top electrode and a bottom electrode, the top and bottom electrodes configured to apply the electric field to the electrically reconfigurable optical layer, wherein the electrically reconfigurable optical layer is disposed between the optically transparent top electrode and the bottom electrode; and a colossal-K dielectric layer disposed between the electrically reconfigurable optical layer and the bottom electrode. The phase-change material of the electrically reconfigurable optical layer may comprise phase-change nickelate or tungsten oxide. The phase-change material of the electrically reconfigurable optical layer may have a perovskite structure. The phase-change nickelate or tungsten oxide may enable to actuate large refractive index changes of more than 1 in infrared wavelength spectrums at high speeds of phase reconfiguration of more than 1 kHz by applying the electric field to the phase-change material.

24 Claims, 10 Drawing Sheets

(51) Int. Cl.
*G02F 1/00* (2006.01)
*G02F 1/19* (2019.01)
*G02B 27/09* (2006.01)
*H04N 5/33* (2006.01)

(58) Field of Classification Search
CPC ..... G02F 1/0356; B82T 20/00; H04N 9/3197; G02B 26/001
USPC ........ 359/263, 245–247, 237, 254–255, 259, 359/315, 238, 321, 322
See application file for complete search history.

(56) References Cited

U.S. PATENT DOCUMENTS

| | | | |
|---|---|---|---|
| 2007/0171504 A1 | 7/2007 | Fujimori | |
| 2011/0038093 A1 | 2/2011 | Furukawa et al. | |
| 2017/0031231 A1 | 2/2017 | Bhaskaran et al. | |
| 2017/0054099 A1* | 2/2017 | Friend | H01L 51/5092 |
| 2018/0046056 A1 | 2/2018 | Na et al. | |
| 2018/0059440 A1* | 3/2018 | Yu | G11C 13/048 |

OTHER PUBLICATIONS

International Search Report for PCT/US2019/021233 dated Jun. 26, 2019.
Written Opinion of the International Searching Authority for PCT/US2019/021233 dated Jun. 26, 2019.
International Preliminary Report on Patentability (Chapter II) for PCT/US2019/021233 dated Sep. 25, 2020.

* cited by examiner

ELECTRICALLY RECONFIGURABLE OPTICAL APPARATUS USING ELECTRIC FIELD

CROSS REFERENCE TO PARENT APPLICATION

This application claims the benefit of U.S. Patent Application Ser. No. 62/641,249, filed on Mar. 9, 2018, entitled "E-FIELD TUNABLE NICKELATE-BASED ELECTRO-OPTIC DEVICES", which is hereby incorporated by reference in its entirety.

TECHNICAL FIELD

Some embodiments of the present disclosure relate to an electrically reconfigurable optical apparatus, and, in particular, to electrically reconfigurable infrared optical elements or pixels comprising a phase-change material; the phase-change material having one or more optical properties that can be continuously changeable or reconfigurable by applying an electric field.

BACKGROUND

Reconfiguration of optical properties of materials enables functional performance benefits in consumer goods, automobiles, and aerospace systems. Dynamic changes to optical material properties including absorption, diffraction, reflection, and scatter have been the subject of intense research. Various stimuli are capable of triggering optical reconfiguration of these properties including heat, light, chemical, and electric field.

Electro-optic materials can be utilized in reconfigurable imaging. Conventional electro-optic materials have challenges in actuating large optical property changes in infrared wavelengths at high reconfiguration speeds. For example, as illustrated in FIG. 1, there is no conventional technology that can provide refractive index changes of more than 1 and high reconfiguration speeds of more than 1 kHz.

Refractive index tuning by nonlinear electro-optic Kerr and Pockels effects or electro-absorptive effects is small for free-space modulation. For example, FIG. 1 shows that the refractive index change ($\Delta n$) of the electro-optic Kerr effect (100) is less than $10^{-2}$ and the refractive index change of the electro-optic Pockels effect (110) is in the range of $10^{-4}$.

While liquid crystals (120) show a sizable change in the refractive index, such as just below 1, their utility in reconfigurable imaging may be limited due to slow tuning speed (e.g. below 10 milliseconds) and high loss in the infrared wavelength.

Based on the Drude-Lorentz model, charge-injection into semiconductors (130) can modulate the refractive index when a significant free carrier charge, such as more than $10^{19}/cm^3$, is introduced. However, as shown in FIG. 1, the refractive index change of conventional semiconductors (e.g., Si, III-Vs) is limited to below $10^{-2}$.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, electrically reconfigurable optical elements (e.g. pixels) may comprise one or more phase-change materials as electrically-controllable optical materials, the electrically-controllable optical materials having one or more optical properties that can be reconfigurable or changeable by an electric field applied to the phase-change materials.

According to some embodiments of the present disclosure, the phase-change material, such as phase-change correlated perovskite nickelate and tungsten oxide (WO3), may enable the actuation of large optical property changes, for instance, but not limited to, refractive index changes of more than 0.1 or 1 at a range of wavelengths spanning the short-wave infrared (SWIR) to the long-wave infrared (LWIR) spectra. The actuation can occur at high speeds, for example, but not limited to, more than 1 kHz by applying the electric field to the phase-change material.

According to some embodiments of the present disclosure, an optical apparatus may comprise: one or more electrically reconfigurable optical elements comprising phase-change correlated perovskite nickelate or tungsten oxide (WO3), wherein one or more optical properties of the electrically reconfigurable optical elements may be reconfigurable by an electric field such that a refractive index (n) of the electrically reconfigurable optical elements comprising the phase-change correlated perovskite nickelate or tungsten oxide (WO3) can be changed or modified significantly (for example, but not limited to, $\Delta n > 0.1$) in an infrared wavelength spectrum or a refractive index change of the electrically reconfigurable optical elements comprising the phase-change correlated perovskite nickelate or tungsten oxide (WO3) is more than 1 in an infrared wavelength spectrum. The phase-change nickelate, of which the electrically reconfigurable optical elements are comprised, may have a perovskite structure. The optical apparatus may be configured to actuate the refractive index change of the electrically reconfigurable optical elements of more than 1 at an electric field of e.g., less than 0.1 MV/cm. The optical apparatus may be configured to apply the electric field to the electrically reconfigurable optical elements comprising the phase-change correlated perovskite nickelate or tungsten oxide (WO3), for example, in a parallel plate capacitor structure, to inject a charge-density of e.g., more than $10^{21}/cm^3$. The optical apparatus may further comprise a colossal-K dielectric material layer disposed proximate to the electrically reconfigurable optical elements. A dielectric constant K of the colossal-K dielectric material may be more than 1000. The colossal-K dielectric material layer may comprise at least one of barium strontium titanate, barium titanate, and strontium titanate.

According to certain embodiments of the present disclosure, an optical apparatus may comprise: an electrically reconfigurable optical layer comprising at least one phase-change material, wherein an optical property of the phase-change material is reconfigurable by an electric field; an optically transparent top electrode and a bottom electrode, the top and bottom electrodes configured to apply the electric field to the electrically reconfigurable optical layer, wherein the electrically reconfigurable optical layer is disposed between the optically transparent top electrode and the bottom electrode; and a colossal-K dielectric layer disposed between the electrically reconfigurable optical layer and the bottom electrode. The phase-change material of the electrically reconfigurable optical layer may comprise phase-change correlated perovskite nickelate or tungsten oxide (WO3). The phase-change material of the electrically reconfigurable optical layer may have a perovskite structure. A dielectric constant K of the colossal-K dielectric layer may be more than 1000. The colossal-K dielectric layer may comprise at least one of barium strontium titanate, barium titanate, and strontium titanate. The optically transparent top electrode may comprise an Ag nanowire-based material, a graphene-based material, or an ultrathin platinum material grown by atomic layer deposition (ALD). A refractive index change of the electrically controllable phase-change material may be more than 1 at an infrared wavelength spectrum. The electrically reconfigurable optical layer may comprise a pixelated array of the phase-change material. The optical apparatus may be configured to actuate the refractive index change of the phase-change material of more than 1 at the electric field of less than 0.1 MV/cm. The optical apparatus may be configured to apply an electric field to the electrically reconfigurable optical layer to inject a charge-density of more than $10^{21}/cm^3$.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

Figure 1:
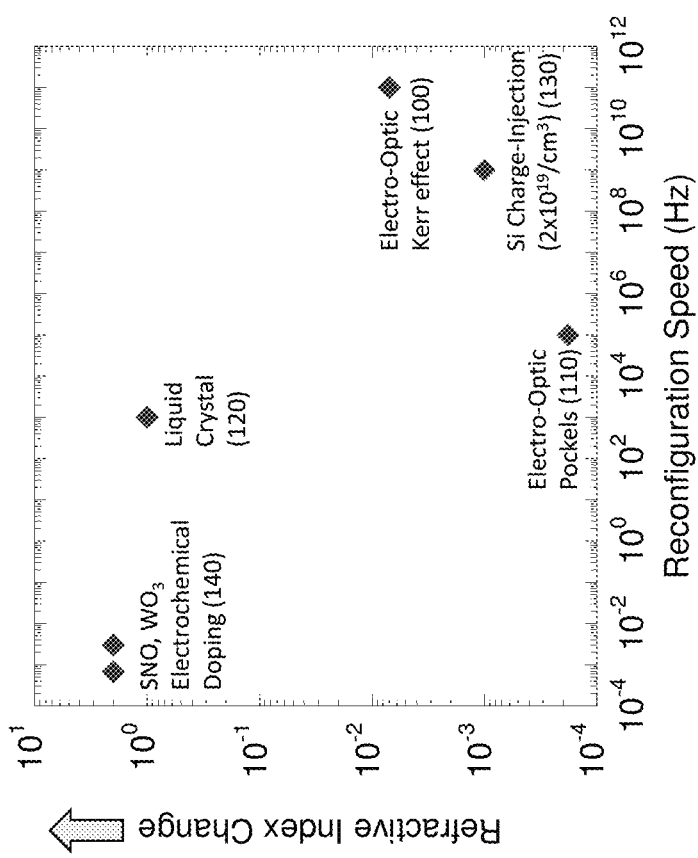
FIG. 1 shows a graph of refractive index changes of electro-optical materials versus reconfiguration speed.

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

According to various embodiments of the present disclosure, electrically reconfigurable optical elements (e.g. infrared optical elements), such as pixels, may comprise one or more phase-change materials as electrically-controllable optical materials, the electrically-controllable optical materials having one or more optical properties that can be reconfigurable or changeable by electric field applied to the phase-change materials. The electrically reconfigurable optical elements may not be mechanically movable with respect to each other.

The phase-change material can have a widely tunable electronic structure that can host a variety of phases. For instance, the phase-change material may have a perovskite structure, for example, but not limited to, $ABO_3$, where "A" and "B" are two elements of very different atomic sizes and "O" is oxygen. Correlated perovskite nickelate, for instance, but not limited to, $GdNiO_3$, $EuNiO_3$, $SmNiO_3$, $NdNiO_3$ and $PrNiO_3$, may be examples of phase-change materials with an octahedral configuration. The correlated perovskite nickelates exhibit phase transitions (i.e., transition between metal and insulator, opaque and transparent, and paramagnetic and antiferromagnetic) accompanied by structural changes in the $NiO_6$ octahedral configuration. Charge doping changes nickel (Ni) orbital occupancy, which leads to structural changes resulting in reconstruction of electronic band structures. The structural changes of the correlated perovskite nickelate may open a band gap and induce a dielectric polarizability change and refractive index per Lorentz-Lorenz relation.

A large optical refractive index change can be associated with an electron-doping-induced phase transition of perovskite nickelates which can be utilized to achieve strong optical modulation. For example, as-deposited samarium nickelate material ($SmNiO_3$, also known as SNO) is electrically conductive and optically opaque while electron-doped $SmNiO_3$ is electrically insulating and optically transparent. In pristine $SmNiO_3$, a single electron can introduce strong optical losses through free carrier absorptions. An extra electron can be acquired, and the fourfold electron degenerate manifold is occupied by two electrons. The strong intra-orbital Coulomb repulsion between two electrons can open a band gap as large as 3 eV and can substantially suppress the free carrier absorption. In this manner, $SmNiO_3$ can be transformed into an optically transparent dielectric. Accordingly, the optical properties of the phase-change material can be reconfigurable or changeable by electron doping or extraction.

Detailed examples of correlated perovskites are described in Li, Zhaoyi et al. (2016). Correlated Perovskites as a New Platform for Super-Broadband-Tunable Photonics. Advanced materials (Deerfield Beach, Fla.). 28. 10.1002/adma.201601204, which is hereby incorporated by reference in its entirety.

Figure 2:
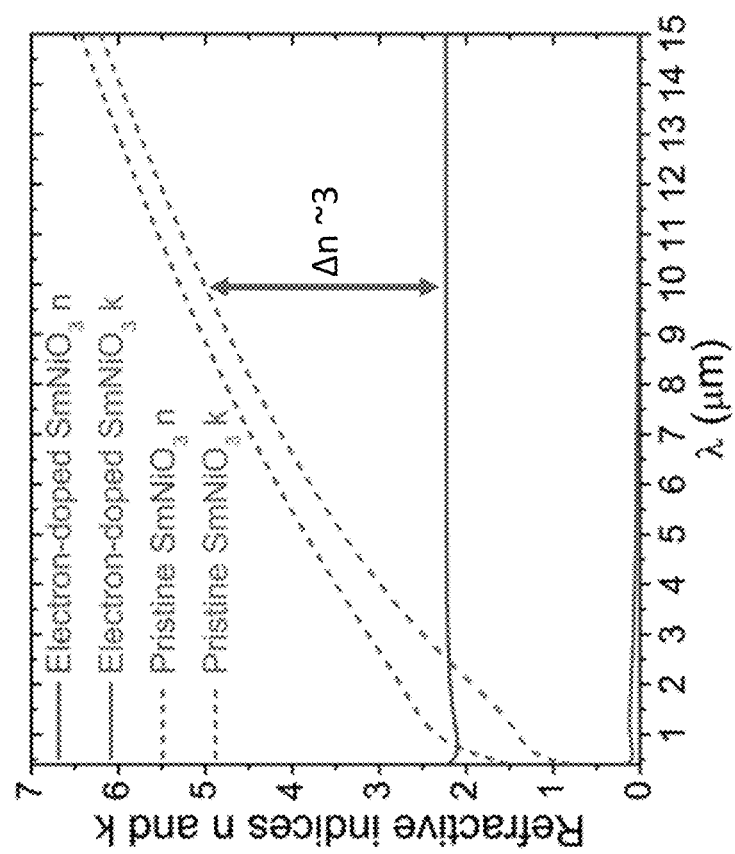
FIG. 2 shows a graph of complex refractive indices of as-deposited and electron-doped samarium nickelate material ($SmNiO_3$, also known as SNO) with respect to wavelengths $\lambda$.

FIG. 2 shows a graph of complex refractive indices of pristine and electron-doped samarium nickelate material ($SmNiO_3$ or SNO) with respect to wavelengths λ. As illustrated in FIG. 2, $SmNiO_3$ shows dramatic changes (Δn) in refractive indices of between 3-5 between two distinct phases, pristine and electron-doped, in the infrared wavelength range, e.g., λ=10 to 15 μm. When a high charge-density, for example, but not limited to, more than $10^{21}/cm^3$, is injected into the phase-change nickelate, refractive index changes (Δn) of more than 1 can be achieved at infrared wavelengths.

The level of charge injected into a phase change material and the degree of the resulting refractive index changes (Δn) induced can be controlled by the strength of electric field applied. Tuning of refractive indices of the phase-change materials can therefore be performed continuously and reversibly.

The phase transition and optical property tuning of the phase-change materials may be based on electron doping or extraction which is independent of temperature constraints. Electron doping in the phase-change material, for example, SNO and $WO_3$ (140 of FIG. 1) can be performed by electrochemical means, but their reconfiguration speed is slow less than $10^{-2}$ Hz as shown in FIG. 1. However, electron doping can be carried out at high reconfiguration speeds by applying an electronic field to the phase-change materials. The electric field, which can control the doping level, can be used to induce the doping-driven phase transition of the phase-change nickelate. The phase-change nickelates can undergo electric-field-tunable phase transitions with the largest changes in the optical properties near the phase transition.

Therefore, according to some embodiments of the present disclosure, the phase-change material, such as phase-change correlated perovskite nickelate or tungsten oxide ($WO_3$), may enable the actuation of large optical property changes, for instance, but not limited to, refractive index changes of more than 1 at a range of wavelengths spanning the short-wave infrared (SWIR) to the long-wave infrared (LWIR) spectra. The actuation can occur at high speeds, for example, but not limited to, more than 1 kHz by applying the electric field to the phase-change material.

Figure 3:
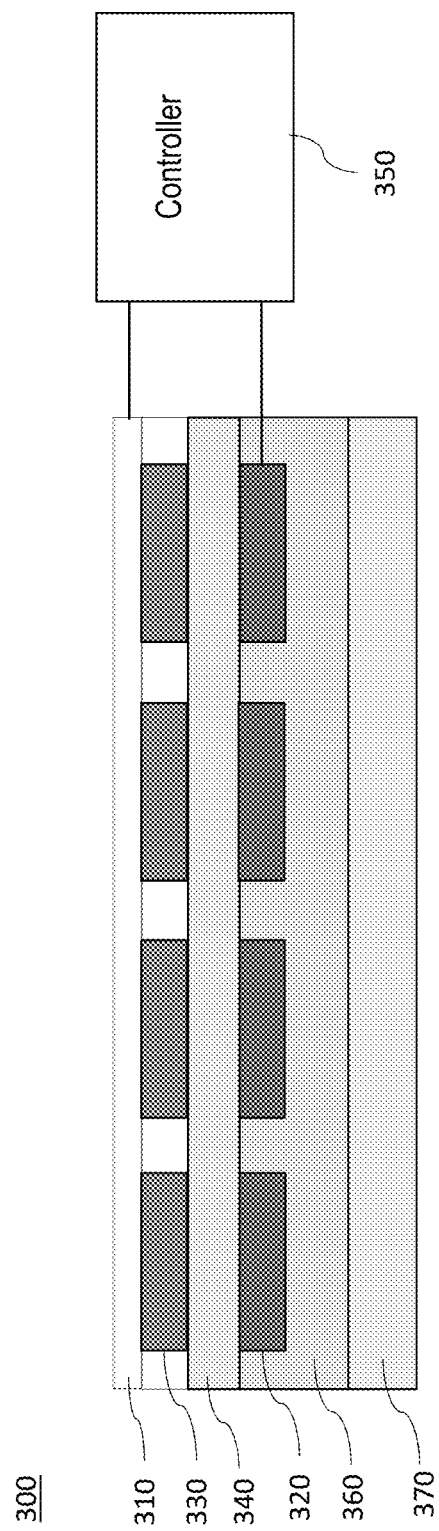
FIG. 3 shows a schematic diagram of an electrically reconfigurable optical apparatus according to an exemplary embodiment of the present disclosure.
Figure 4A:
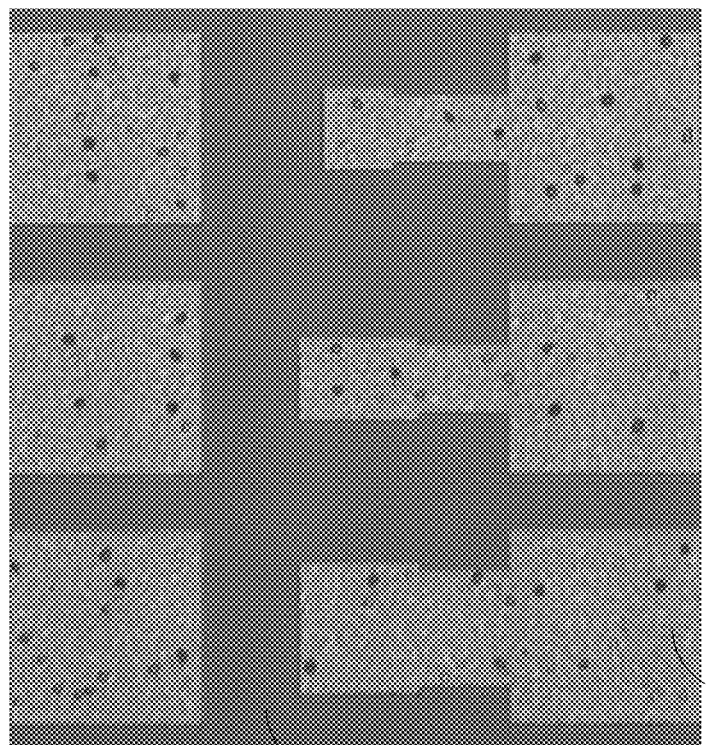
FIGS. 4A-4C illustrate partial top views of an electrically reconfigurable optical apparatus according to exemplary embodiments of the present disclosure.
Figure 4B:
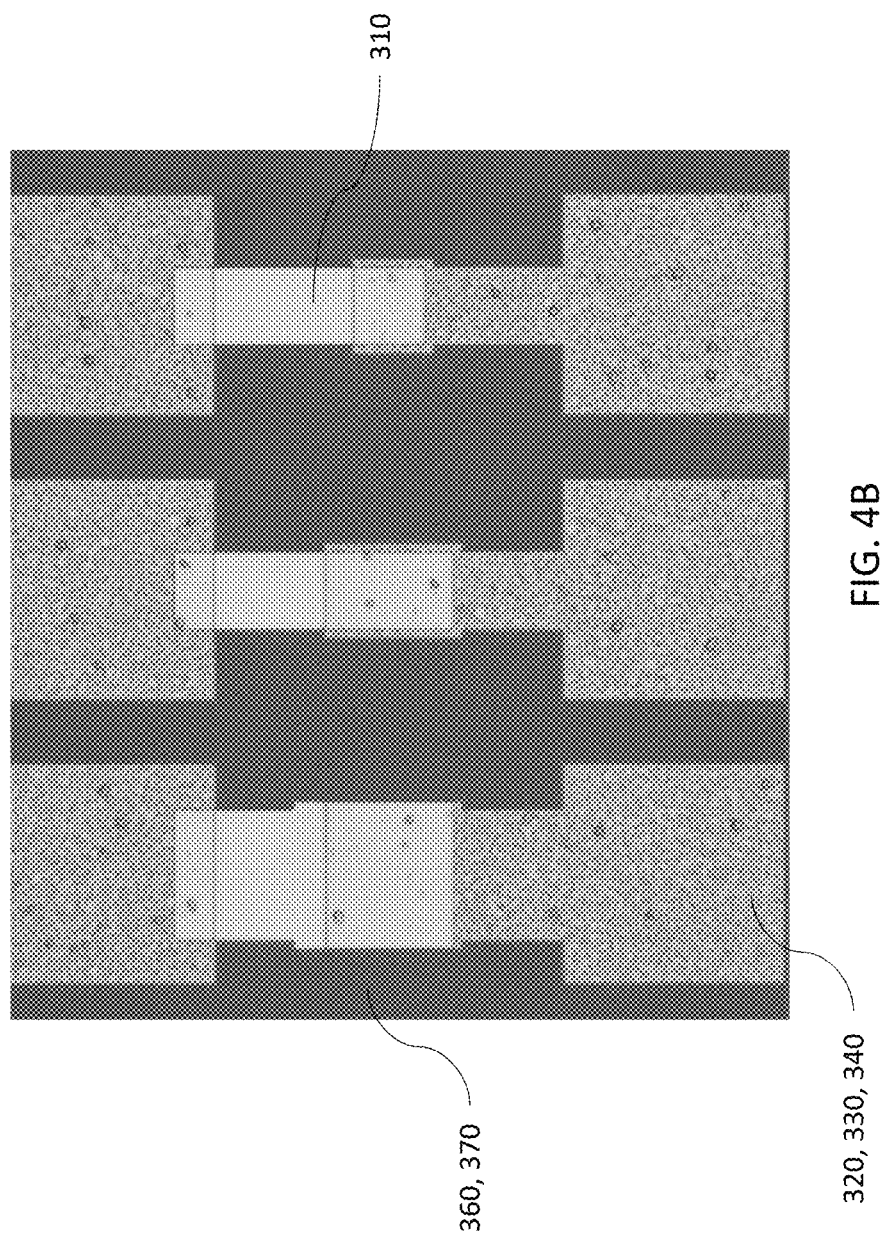
Figure 4C:
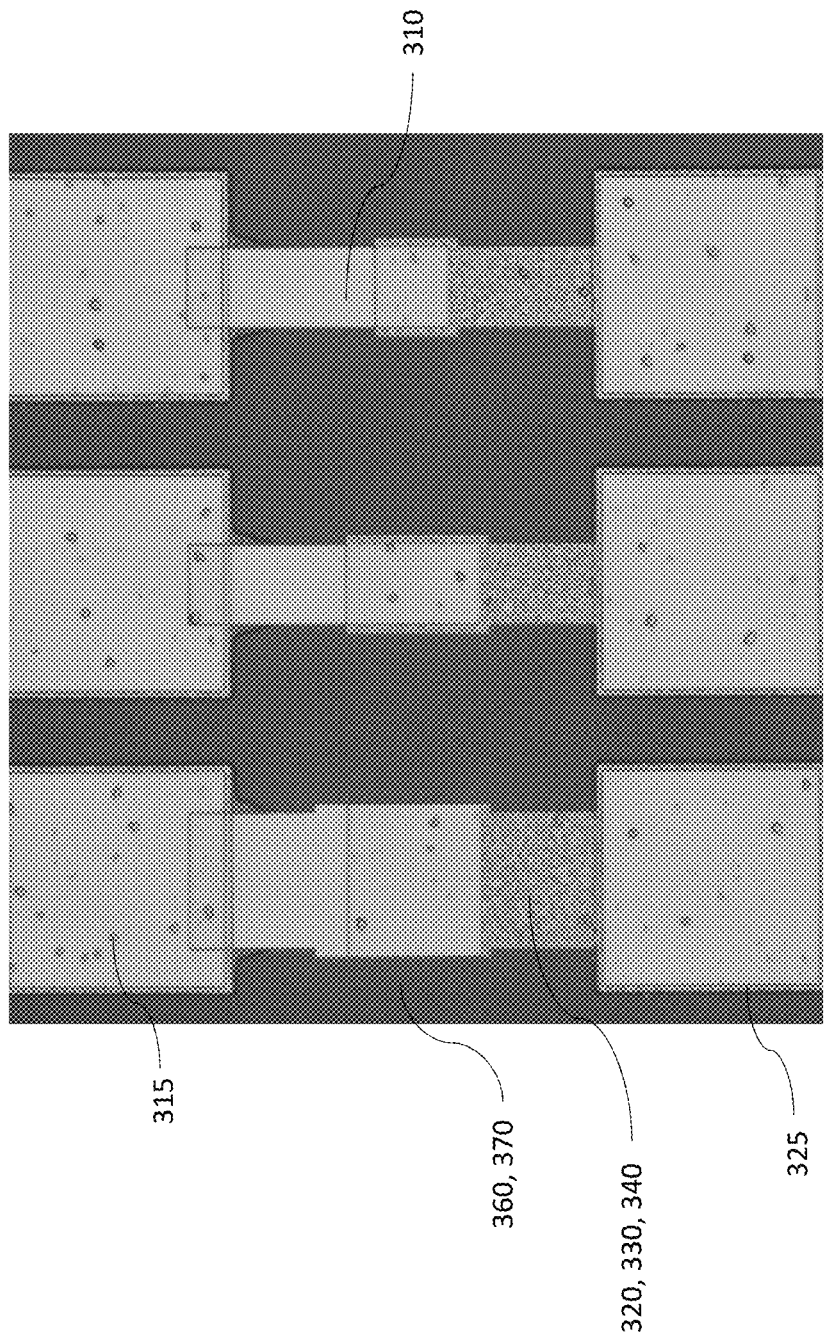

FIG. 3 shows a schematic diagram of an electrically reconfigurable optical apparatus according to an exemplary embodiment of the present disclosure. FIGS. 4A-4C show partial top views of an electrically reconfigurable optical apparatus according to exemplary embodiments of the present disclosure.

An electrically reconfigurable optical apparatus 300 may comprise one or more top electrodes 310, one or more bottom electrodes 320, an electrically controllable/reconfigurable optical layer 330 having a two dimensional array of electrically reconfigurable optical elements, a dielectric layer 340, a controller 350, an electrically insulating layer 360, and optionally a substrate 370. FIG. 4A illustrates the stacked layers of the electrically reconfigurable optical apparatus 300 including the electrically controllable/reconfigurable optical layer 330, the dielectric layer 340, the bottom electrodes 320, the electrically insulating layer 360, and the substrate 370. FIG. 4B shows the top electrodes 310 disposed on the stacked layers illustrated in FIG. 4A. As shown in FIG. 4C, the electrically reconfigurable optical apparatus 300 may further comprise contact pads 315 and 325 for the controller 350. For example, the first contact pads 315 may be disposed on the top electrodes 310 to connect between the top electrodes 310 and the controller 350. The second contact pads 325 may be disposed on the bottom electrodes 320 to connect between the bottom electrodes 320 and the controller 350. In the exemplary embodiments shown in FIGS. 4B and 4C, opaque metal film may be used for the top electrodes 310 for visual identification.

Figure 5:
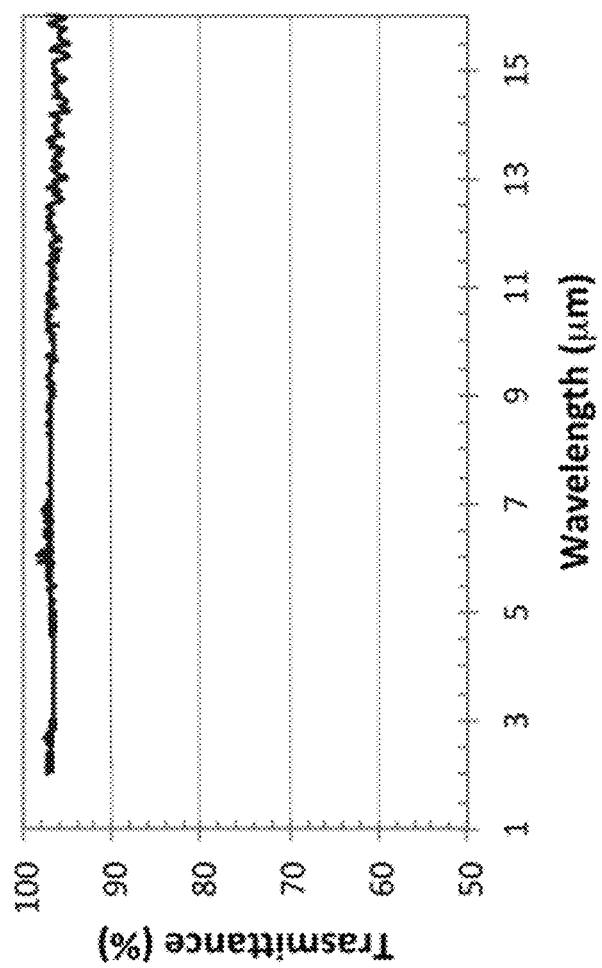
FIG. 5 illustrates a graph of optical transmittance of the Graphene-based electrode with respect to wavelengths according to exemplary embodiments of the present disclosure.

The top electrode(s) 310 may be disposed on or over the electrically reconfigurable optical layer 330. The top electrode(s) 310 may be optically transparent for at least one wavelength range. The top electrodes 310 may include, for example, but not limited to, a silver (Ag) nanowire-based transparent conductor, a graphene-based transparent material, or an ultrathin metal (e.g., Pt) film grown by atomic layer deposition (ALD). For example, FIG. 5 illustrates a graph of optical transmittance of the graphene-based electrode with respect to wavelengths. As shown in FIG. 5, the graphene-based electrode has more than 95% optical transmittance in the 2-16 μm wavelength range.

The bottom electrode(s) 320 may be disposed under or below the electrically reconfigurable optical layer 330. The bottom electrode(s) 320 may comprise metal. Additionally, the bottom electrode(s) 320 may be grounded. An example of the contact pads 325 for the bottom electrodes 320 is illustrated in FIG. 4C.

The electrically reconfigurable/controllable optical layer 330 may comprise one or more phase-change materials which are described in detail above. As described above, the phase-change materials may have a perovskite structure, and may include, for example, but not limited to, a phase-change nickelate, such as correlated perovskite nickelates (i.e. $GdNiO_3$, $EuNiO_3$, $SmNiO_3$, $NdNiO_3$ and $PrNiO_3$) and tungsten oxide ($WO_3$).

The top and bottom electrodes 310 and 320 may be configured to apply the electric field to the electrically reconfigurable optical layer 330. The electric field applied by the electrodes 310 and 320 may change the optical properties of the electrically reconfigurable optical layer 330, such as refractive indices.

The dielectric layer 340 may be disposed between the electrically reconfigurable optical layer 330 and the bottom electrode 320. The dielectric layer 340 may comprise one or more dielectric materials having colossal dielectric constants, i.e. values of the real part of the permittivity ε exceeding 1000. Barium strontium titanate (BST: $Ba_xSr_{1-x}TiO_3$, for example, but not limited to, $BaTiO_3$ and $SrTiO_3$ superlattices) may be one example of the dielectric materials having colossal dielectric constants (k).

Integration of the colossal-k dielectric layer 340 may induce a strong electric field effect. By integrating the electrically reconfigurable optical layer 330 having correlated perovskite nickelate with the colossal-k dielectric layer 340, the electrically reconfigurable optical layer 330 may be continuously tunable while allowing refractive index change of more than 1 at below 0.1 MV/cm electric field and keeping within the breakdown field of the colossal-k dielectric layer 340 of more than 1 MV/cm.

The controller 350 may be connected to the top and bottom electrodes 310 and 320 to control the electric field applied to the electrically reconfigurable optical layer 330. The controller 350 may be configured to control the top and bottom electrodes 310 and 320. For example, the controller 350 may be configured to supply voltages to the top and bottom electrodes 310 and 320. The controller 350 may be, for instance, but not limited to, an electric circuit having a voltage supplier.

The electrically insulating layer 360 may be disposed under or below the bottom electrode 320 and/or the dielectric layer 340. The insulation layer 360 may cover at least a portion of the bottom electrode 320 and/or the dielectric layer 340. For example, the insulation layer 360 may include silicon dioxide (SiO$_2$). Additionally, the substrate 370 may be disposed under or below the insulating layer 360.

The electrically reconfigurable optical apparatus 300 may be monolithically integrated on the top of complementary metal-oxide-semiconductor (CMOS) control integrated circuits (ICs).

Further, the phase-change material described above can be provided in several different architectures. For example, the phase-change material can be implemented in high-speed reconfigurable infrared optical devices, for example, but not limited to, infrared mirrors, lenses and gratings.

Alternatively, according to an embodiment of the present disclosure, the bottom electrodes 320, the insulating layer 360, and the substrate 370 can also be optically transparent. For example, in the infrared wavelength range, BST may be used for the transparent insulating layer 360, and GaAs may be used for the transparent substrate 370; in the visible wavelength range, SiO$_2$ or Si$_3$N$_4$ may be used for the transparent insulating layer 360, and glass, polymer (e.g., polyimide, PET, and PDMS), and sapphire may be used for the transparent substrate 370.

Figure 6:
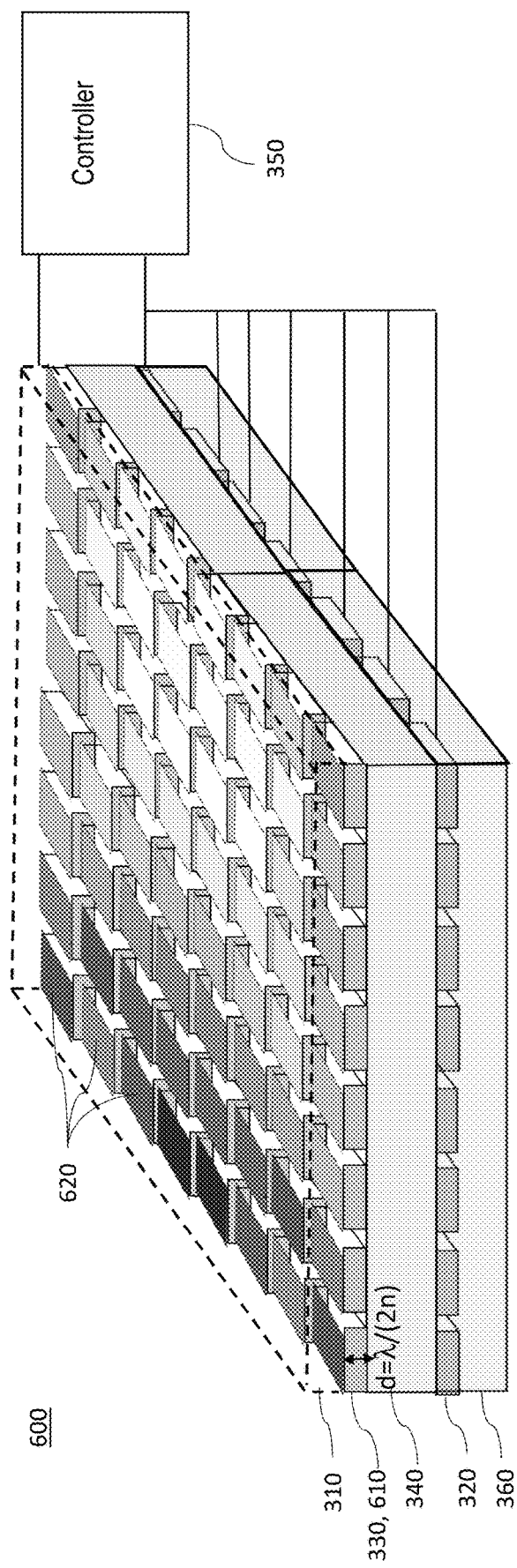
FIG. 6 shows a schematic diagram of an electrically reconfigurable infrared lens according an exemplary embodiment of the present disclosure.

FIG. 6 shows a schematic diagram of an electrically reconfigurable infrared lens according to an exemplary embodiment of the present disclosure.

The electrically reconfigurable optical apparatus 300 of FIG. 3 may be utilized in a reconfigurable reflective lens (or focusing mirror) 600.

The electrically controllable optical layer 330 may comprise a pixelated array 610 of phase-change material cells 620. The phase-change material cells 620 may comprise one or more phase-change materials described above. The pixelated array 610 of the phase-change material cells 620 may be an electrically programmable two-dimensional array. For example, the pixelated array 610 of the phase-change material cells 620 may be programmed to have a spatially-variant refractive index distribution with nearly zero DC power dissipation and no temperature rise. Each of the phase-change material cells 620 may be tunable by the electric field applied by corresponding top and bottom electrodes 310 and 320. At least one controller 350 connected to the top and bottom electrodes 310 and 320 may be configured to control the electric fields applied to each electrically controllable material cell 620 by supplying a voltage to the corresponding top and bottom electrodes 310 and 320. The electric field may modulate the optical properties of each of the electrically controllable material cells 620. Therefore, the controller 350 may control each electrically controllable material cell 620 independently. For example, the optical property of each electrically controllable material cell 620 may be controlled independently. The modulation of the optical properties (for example, refractive index) of the electrically controllable material cells 620 may provide focal depth tunability of the array lens 600. For example, the focal depth of the lens 600 changes by 2 cm for each increment of 0.1 in the change Δn of the refractive index, assuming a small (for example, 1 mm) aperture diameter. Accordingly, the reconfigurable reflective lens 600 may set the spatial distribution of the refractive indices of the phase-change material cells 620 of the pixelated array 610 to vary the focal length for an incident plane wave. The reconfigurable reflective lens 600 may control the reflection phases of optical beams at each of the phase-change material cells 620 of the pixelated array 610 independently over a range of 0 to 360 degrees, and therefore can control near-field focusing or far-field radiation. The pixelated array 610 of the phase-change material cells 620 can each be controlled to have reflection phases of optical beams from 0 to 360 degrees. These reflection phases can be achieved by tuning the refractive index of the phase-change material cells 620. The phase shift θ through the phase-change material of thickness d and refractive index n is:

$$\theta = 2dnk_0,$$

where $k_0$ is a free space wavenumber. It is taken into account that, in reflective optical devices, the wave travels through the material thickness twice (2d) due to reflection off the back surface.

Figure 7:
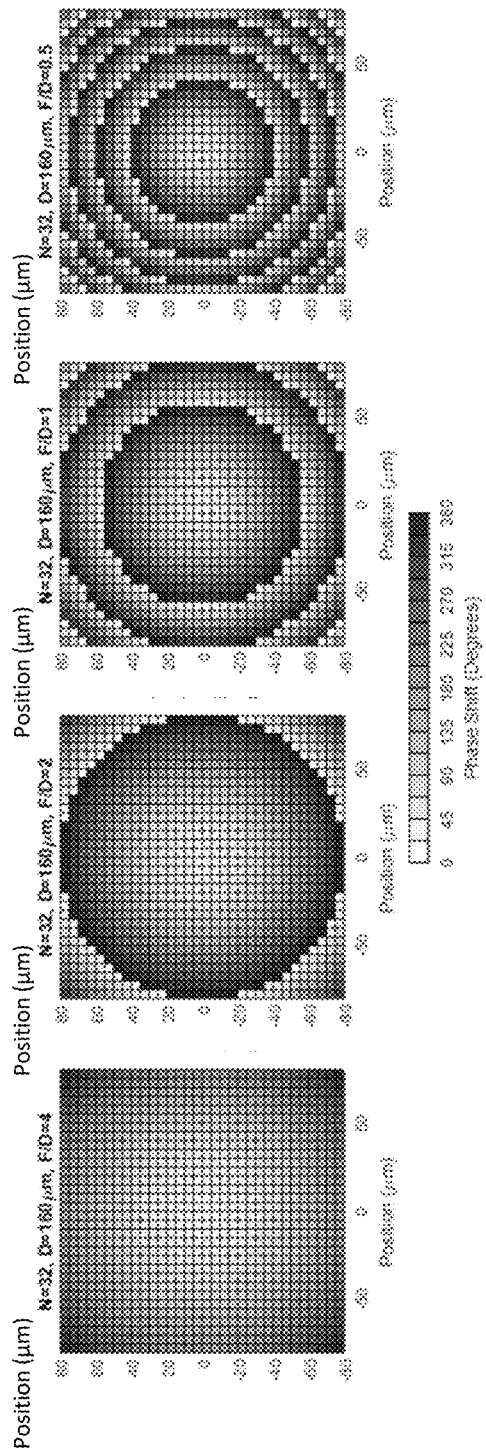
FIG. 7 shows reflection phases for a 32×32 pixel array for f-numbers (F/D) of 4, 2, 1, and 0.5 according to exemplary embodiments of the present disclosure.

FIG. 7 shows reflection phases for a 32×32 pixel array for f-numbers (F/D) of 4, 2, 1, and 0.5 according to exemplary embodiments of the present disclosure. F is the focal length of the mirror and D is the diameter of the aperture. Each reflection phase of each pixel for the 32×32 pixel array can be changed independently over a range of 0-360 degrees, and thus this may enable control of near-field focusing or far-field radiation. The reflection phases for the 32×32 pixel array may be set to provide varying focal lengths for an incident plane wave. The reflection phases illustrated in FIG. 7 are calculated/modeled phase shifts rather than measured data.

Figure 8:
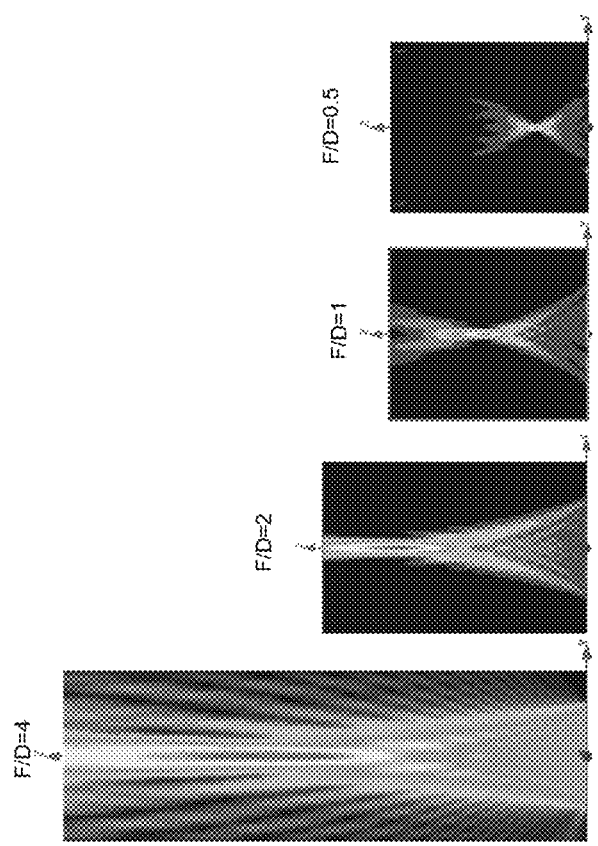
FIG. 8 shows simulation results of lens configurations for f-numbers (F/D) of 4, 2, 1, and 0.5 according to exemplary embodiments of the present disclosure.

FIG. 8 shows simulation results of lens configurations for f-numbers (F/D) of 4, 2, 1, and 0.5 according to exemplary embodiments of the present disclosure. As shown in FIG. 8, a reconfigurable lens can be reconfigured to obtain various focal distances over a wide range, resulting in an extremely large tunability of f-number while only needing the capability to achieve phase reflections from θ=0–2π. However, as with traditional lenses, larger focal distances create larger focal spots due to diffraction.

According to some embodiments of the present disclosure, the phase-change material, such as phase-change nickelate and tungsten oxide (WO3), may enable to actuate large optical property changes, for instance, but not limited to, refractive index changes of more than 1, in infrared wavelength spectrums at high speeds of phase reconfiguration, for example, but not limited to, more than 1 KHz by applying the electric field to the phase-change material.

According to certain embodiments of the present disclosure, by integrating an electrically reconfigurable optical layer having correlated perovskite nickelate with a colossal-K dielectric layer, the electrically reconfigurable optical layer may be continuously tunable while allowing refractive index change of more than 0.1 or 1 at below 0.1 MV/cm electric field and keeping within the breakdown field of the colossal-K dielectric layer of more than 1 MV/cm.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. An electrically-programmable reflector, comprising:
a two dimensional array of electrically reconfigurable optical elements comprising phase-change correlated perovskite nickelate or tungsten oxide, wherein one or more optical properties of the electrically reconfigurable optical elements are reconfigurable by an electric field such that a refractive index of the electrically reconfigurable optical elements comprising the phase-change nickelate or tungsten oxide is changeable at an infrared wavelength; and
a colossal-K dielectric layer disposed proximate to the electrically reconfigurable optical elements.

2. The electrically-programmable reflector of claim 1, wherein the electrically reconfigurable optical elements are not mechanically movable with respect to each other.

3. The electrically-programmable reflector of claim 1, wherein the refractive index of the electrically reconfigurable optical elements comprising the phase-change correlated perovskite nickelate or tungsten oxide is changeable by more than 0.1.

4. The electrically-programmable reflector of claim 1, wherein the refractive index of the electrically reconfigurable optical elements comprising the phase-change correlated perovskite nickelate or tungsten oxide is changeable by more than 1.

5. The electrically-programmable reflector of claim 1, wherein the phase-change correlated perovskite nickelate comprises at least one of $GdNiO_3$, $EuNiO_3$, $SmNiO_3$, $NdNiO_3$ and $PrNiO_3$.

6. The electrically-programmable reflector of claim 1, wherein the electrically-programmable reflector is configured to actuate a refractive index change of the electrically reconfigurable optical elements of more than 0.1 with the electric field applied.

7. The electrically-programmable reflector of claim 1, a wherein the colossal-K dielectric layer has a dielectric constant K more than 1000.

8. The electrically-programmable reflector of claim 1, wherein the colossal-K dielectric layer comprises at least one of barium strontium titanate, barium titanate, and strontium titanate.

9. An optical apparatus, comprising:
one or more electrically reconfigurable optical elements comprising phase-change nickelate or tungsten oxide, wherein one or more optical properties of the electrically reconfigurable optical elements are reconfigurable by an electric field such that a refractive index of the electrically reconfigurable optical elements comprising the phase-change nickelate or tungsten oxide is changeable by more than 0.1 at an infrared wavelength.

10. The optical apparatus of claim 9, wherein the electrically reconfigurable optical elements comprising the phase-change nickelate or tungsten oxide has a perovskite structure.

11. The optical apparatus of claim 9, wherein the phase-change nickelate comprises at least one of $GdNiO_3$, $EuNiO_3$, $SmNiO_3$, $NdNiO_3$ and $PrNiO_3$.

12. The optical apparatus of claim 9, wherein the optical apparatus is configured to actuate a refractive index change of the electrically reconfigurable optical elements of more than 0.1 with the electric field applied.

13. The optical apparatus of claim 9, further comprising a colossal-K dielectric layer disposed proximate to the electrically reconfigurable optical elements.

14. The optical apparatus of claim 13, wherein the colossal-K dielectric layer comprises at least one of barium strontium titanate, barium titanate, or strontium titanate.

15. An optical apparatus, comprising:
an electrically reconfigurable optical layer comprising at least one phase-change material, wherein an optical property of the phase-change material in a predetermined wavelength range is reconfigurable by an electric field;
a top electrode and a bottom electrode, the top and bottom electrodes configured to apply the electric field to the electrically reconfigurable optical layer, wherein the electrically reconfigurable optical layer is disposed between the optically transparent top electrode and the bottom electrode and wherein the top electrode is optically transparent in said wavelength range; and
a colossal-K dielectric layer disposed between the electrically reconfigurable optical layer and at least one of the top and the bottom electrode.

16. The optical apparatus of claim 15, wherein the phase-change material of the electrically reconfigurable optical layer comprises phase-change nickelate or tungsten oxide.

17. The optical apparatus of claim 16, wherein the phase-change nickelate comprises at least one of $GdNiO_3$, $EuNiO_3$, $SmNiO_3$, $NdNiO_3$ and $PrNiO_3$.

18. The optical apparatus of claim 15, wherein the phase-change material of the electrically reconfigurable optical layer has a perovskite structure.

19. The optical apparatus of claim 15, wherein the colossal-k dielectric layer comprises at least one of barium strontium titanate, barium titanate, and strontium titanate.

20. The optical apparatus of claim 16, wherein the optically transparent top electrode comprises an Ag nanowire-based material, Graphene-based material, and an ultrathin metal film made by an Atomic layer deposition.

21. The optical apparatus of claim 16, wherein a refractive index change of the electrically phase-change material is more than 0.1 at an infrared wavelength spectrum.

22. The optical apparatus of claim 16, wherein a refractive index change of the electrically phase-change material is more than 1 at an infrared wavelength spectrum.

23. The optical apparatus of claim 16, wherein the electrically reconfigurable optical layer comprises a pixelated array of the phase-change material.

24. The optical apparatus of claim 21, wherein the optical apparatus is configured to actuate the refractive index change of the phase-change material of more than 0.1 with the electric field applied.

* * * * *